April 5, 1927.  
R. R. BEEZLEY  
1,623,332  
STORAGE BATTERY TERMINAL  
Filed Aug. 3, 1922
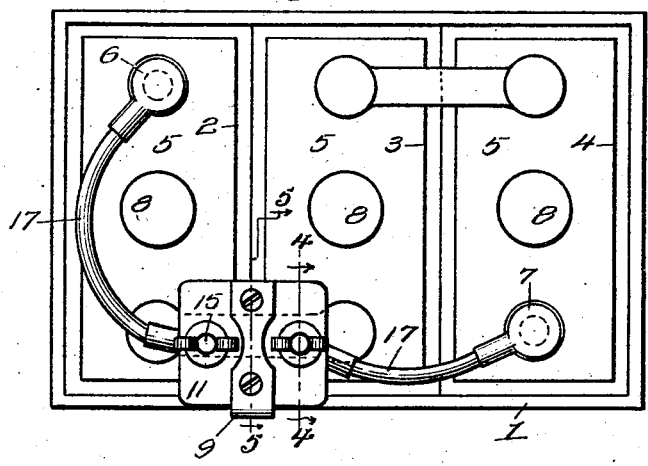
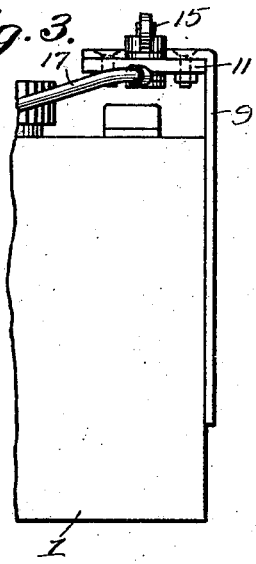
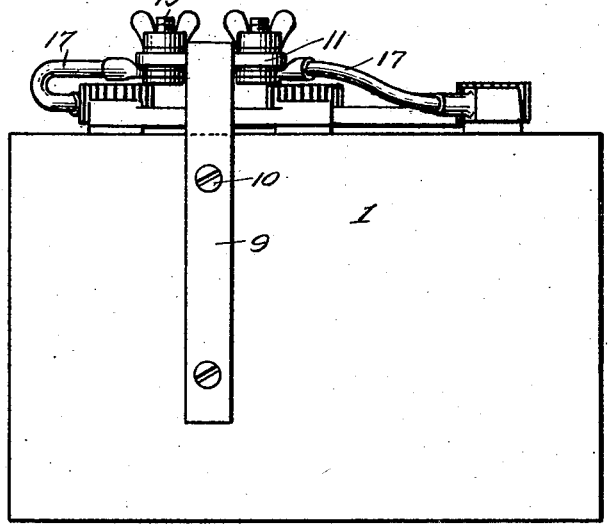
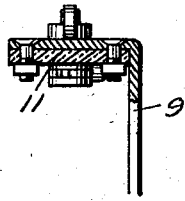
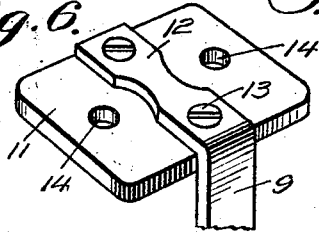
Inventor  
Reginald R. Beezley  
By Geo. P. Kimmel  
Attorney Patented Apr. 5, 1927.

1,623,332

UNITED STATES PATENT OFFICE.

REGNALD RUFUS BEEZLEY, OF MEMPHIS, TENNESSEE.

STORAGE-BATTERY TERMINAL.

Application filed August 3, 1922. Serial No. 579,419.

This invention has reference to storage battery terminal blocks and its object is to provide a means for attaching external circuits to the storage battery without liability of doing harm to the battery jar.

Storage batteries as ordinarily constructed have the jars provided with covers of hard rubber composition or some other such material, which, when subjected to strains, are liable to crack with the result that the electrolyte will seep through such cracks and attack external metal parts producing corrosions often so extensive as to cause the destruction of such metal parts and necessitating the entire renewal thereof.

In accordance with the invention, the battery terminals are provided with flexible or like conductors suitably insulated and covered with lead and so arranged that the current will flow from the battery terminals to supplementary terminals anchored solidly to the battery case, which is usually made of wood, and therefore will not yield to the external conductors, thus avoiding the forces which cause cracking of the rubber or rubber-like covers of the cells.

Since the storage battery is not subjected to any forces tending to displace the battery terminals, cracking of the battery cover in the immediate neighborhood of the terminals, is avoided and consequently the electrolyte does not find escape to the exterior of the battery.

The invention will be best understood from a consideration of the following detailed description taken in connection with the accompanying drawings, forming part of this specification, with the understanding however that the invention is not confined to any strict conformity to the showing of the drawings, but may be changed and modified so long as such changes and modifications mark no material departure from the salient features of the invention as expressed in the appended claim.

In the drawings;

Figure 1 is a plan view of a storage battery having the invention applied.

Fig. 2 is a side elevation of the battery as viewed from the lower side thereof as shown in Fig. 1.

Fig. 3 is a fragmentary view as shown in Fig. 2.

Fig. 4 is a section on the line 4—4 of Fig. 1.

Fig. 5 is a section on the line 5—5 of Fig. 1.

Fig. 6 is a perspective view of a supplemental terminal support constituting the invention.

Fig. 7 is a perspective view of one of the connectors shown in Figs. 1, 2 and 3.

Referring to the drawings, there is shown a battery box 1 which, as is customary, may be made of suitably protected wood, and within this box are contained storage battery cells 2, 3 and 4, as is customary in a six volt storage battery, with each cell 2, 3 and 4 provided with a cover 5 of suitable protecting material which is usually more or less friable.

The terminals of the storage battery are in the form of posts 6, 7.

In certain of the figures, there are shown plugs 8, whereby the electrolyte may be filled into the several cells of the storage battery as needed, but these filling plugs require no description since they form no part of the invention.

At one side of the battery box 1, there is erected a standard 9 preferably secured in place by screws 10 so as to produce a rigid structure. The standard 9 rises above the top of the box 1 and has secured to it a plate 11, of appropriate size for the purposes of the invention.

The plate 11 may be made of electrically insulating material and is made fast to a lateral extension 12 of the standard 9 by screws 13. On opposite sides of the lateral extension 12, the plate 11 is pierced by passages 14 of appropriate size to pass the stems of thumb screw binding posts 15, so that these binding posts may be made to engage yoke terminals 16 leading and made fast to the terminals 6 and 7, respectively and terminating in conducting strands 17 whereby the battery terminals 6 and 7 may be individually connected to the binding post 15, but electrical insulation is brought about by the insulating plate 11.

The conductors 17 are each fixedly connected to a respective terminal 6 or 7 at one end and at the other end to a binding post 15 so that under ordinary circumstances of use, no strains are applied to the terminals 6 and 7 and consequently there is no danger of transmitting strains to the terminals 6 or 7 and to the cover portions of the cells, nor to the lead elements of the battery. For this reason no strains liable to crack or otherwise injure the cover portions of the cells are transmitted thereto, and cracks therefore do not occur therein. For this reason the electrolyte finds no access to the exterior of the cell and no corrosion takes place.

All strains which may be transmitted to the terminal posts 6 and 7 are avoided and the injury to the cover portions of the cells do not occur with the result that no deterioration of the mechanical parts of the cell can take place.

Since all strains which heretofore have been borne by the terminals of the battery are, with the present invention, transmitted to and sustained by a rigid support made fast to the battery box, injury to the battery itself is entirely eliminated and the life of the battery is correspondingly prolonged. Also corroded terminals are done away with because there is no chance for the electrolyte to leak from the interior of the battery through the cover portions thereof about the terminal posts.

The binding posts 15 are particularly useful since they make it possible to couple up the terminals 6 and 7 with external conductors leading from the battery, without the aid of tools.

What is claimed is:—

A storage battery terminal comprising an inverted substantially L-shaped bracket having each arm provided with a plurality of apertures for the passage of hold fast devices, the long arm of said bracket being designed to be secured to the side of the battery box with its other arm overhanging and spaced from the battery box top, a relatively wide but thin insulation plate having said other arm extended medially thereof, securing elements passed through the other arm to secure said plate thereto, and binding posts removably passed through the insulation plate one on either side of the arm attached thereto, and having wing nuts for the detachable engagement of battery terminals with the post.

In testimony whereof, I affix my signature hereto.

REGNALD RUFUS BEEZLEY.